United States Patent
Watanabe et al.

[15] 3,696,854
[45] Oct. 10, 1972

[54] BIAS PLY TIRE HAVING A BREAKER WITH GLASS CORDS

[72] Inventors: Tetsuo Watanabe; Akira Oikawa; Masayoshi Kuroda, all of Tokyo, Japan

[73] Assignee: Bridgestone Tire Company Limited, Tokyo, Japan

[22] Filed: April 14, 1970

[21] Appl. No.: 28,340

[30] Foreign Application Priority Data

April 24, 1969 Japan..............44/31258

[52] U.S. Cl.............................152/361
[51] Int. Cl...............................B60c 9/18
[58] Field of Search.......152/354, 355, 356, 360, 361

[56] References Cited

UNITED STATES PATENTS

| | | |
|---|---|---|
| 3,126,042 | 3/1964 | Cegnar.................152/361 |
| 3,233,649 | 2/1966 | Jolivet et al.............152/361 |
| 2,541,506 | 2/1951 | Cuthbertson et al.152/361UX |
| 3,242,965 | 3/1966 | Mirtain..................152/361 |
| 3,397,729 | 8/1968 | Sperberg................152/354 |
| 2,960,139 | 11/1960 | Engstrom et al..........152/354 |

Primary Examiner—Arthur L. La Point
Assistant Examiner—George W. Libman
Attorney—Fleit, Gipple & Jacobson

[57] ABSTRACT

A pneumatic tire having a breaker with glass cords, whose durability and maneuverability are improved by inserting one or more layers of rubberized textile fiber cords between rubberized glass cord layers and the tread portion of the tire.

6 Claims, 5 Drawing Figures

BIAS PLY TIRE HAVING A BREAKER WITH GLASS CORDS

This invention relates to a pneumatic tire, and more particularly to an improvement of a durable pneumatic tire having a breaker with glass cords.

In order to improve the durability and maneuverability of pneumatic tires having breakers reinforced only by natural or synthetic fiber cords (e.g., cotton, hemp, nylon, rayon, vinylon, polyester, etc.), it has been tried to replace such natural or synthetic reinforcing cords with glass cords. Tires having breakers with such glass cords, however, have serious drawbacks in that the glass cords disposed in the tire breaker are likely to cause tire separation (i.e., tire breakdown due to the separation of the glass cords from the rubber member of the tire), because of the inherent nature of the glass cords. Accordingly, the tires with such glass cord reinforcement have a very short service life, despite the fact that long durability is one of the fundamental requirements of pneumatic tires, although the maneuverability and the tread durability of the tires may be improved by the use of glass cords.

Therefore, an object of the present invention is to obviate the aforesaid difficulties of the known pneumatic tires with glass cords, used as breaker reinforcement, by providing an improved pneumatic tire with a glass cord reinforced breaker having outstanding resistance to tire separation while retaining the excellent durability and maneuverability.

The inventors have conducted a series of studies on the mechanism of tire separation of the pneumatic tires with breakers reinforced only by glass cords, and have found that the causes of the tire separation can roughly be classified into the following two groups, which causes vary depending on the operating conditions of the tire.

Namely, first group of causes due to cuts or cracks generated in the rubber crown portion of the tire tread and second group of causes indifferent to such cuts and cracks.

In the case of the first group of causes, water or mud penetrates through the cuts or cracks to the inside of the tread, to deteriorate the surface treating agent (e.g., Resorcin Formaldehyde Latex) applied to individual fine glass fibers constituting the glass cords, so that the bare glass fibers move relative to each other while being in contact with each other, so that there may be caused cord breakage resulting in tire separation.

The second group of causes tend to appear toward the end of the running service life of the tire. As the mileage of tire operation increases, the tread rubber layer is worn and becomes thin, and the mechanical impulses due to the undulation of the road surface are likely to directly reach the breaker without being absorbed by the tread rubber layer. As a result, the glass cords in the breaker are subjected to more frequent bending, which causes the fatigue of the material, so as to induce the glass cord breakage. Thus, the tire separation is caused.

Of the two groups of causes of the tire separation, the first group is more salient when the tire is used on a rugged road covered with gravels having sharp edges, or when the tire tread is made of rubber having poor resistance to cutting and cracking. On the other hand, if the tire is used on a road covered with rounded gravels, or if the tread rubber has high resistance to cutting and cracking, the second group of cause becomes more salient.

Accordingly, for the prevention of the tire separation in pneumatic tires with glass cord reinforced breaker, it is necessary to use such tire structure which inhibits the penetration of water and mud to the glass cords even when the tread rubber member is cut or cracked. Furthermore, the construction of the breaker and the tread should be such that bending and impulsive loads on the tire surface are damped before reaching the glass cords, so as to reduce the risk of the fatigue and breakage of the glass cords due to such loads.

Based on the above findings, the inventors have confirmed by experiments that the aforesaid difficulties of the known pneumatic tires with glass cords reinforced treads can be mitigated by inserting one or more rubberized textile fiber cord layers between the breaker and the tread of such tire.

For a better understanding of the invention, reference is made to the accompanying drawings, in which.

Like parts are designated by like numerals throughout the drawings.

Figure 1:
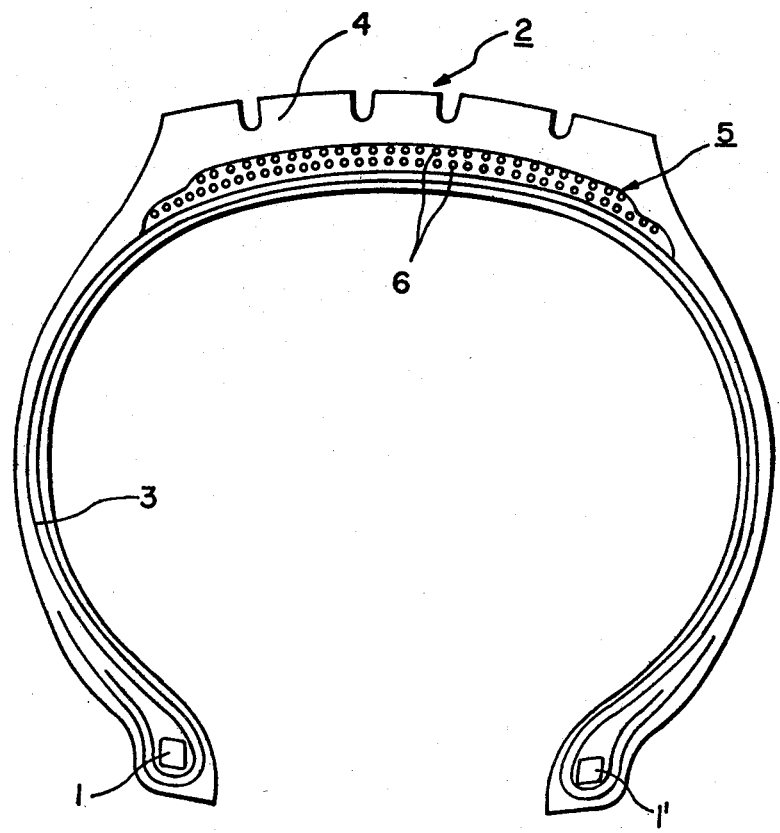
FIG. 1 is a lateral sectional view of a conventional pneumatic tire with glass cord reinforcement.

Referring to FIG. 1, a conventional pneumatic tire, which includes a breaker reinforced only by rubberized glass cords, comprises a pair of bead portions 1, 1' being disposed symmetrically relative to the equatorial center plane of the tire; a carcass 3 consisting of cords being secured to the bead portions at the opposite ends thereof, respectively, and extending from one bead portion to the other bead portion through a tire crown portion 2; a tread rubber 4 surrounding the peripheral surface of the carcass 3; and a breaker 5 disposed in the crown portion 2 between the carcass 3 and the tread rubber 4, which breaker 5 is provided with a reinforcing glass cord layer 6.

Figure 2:
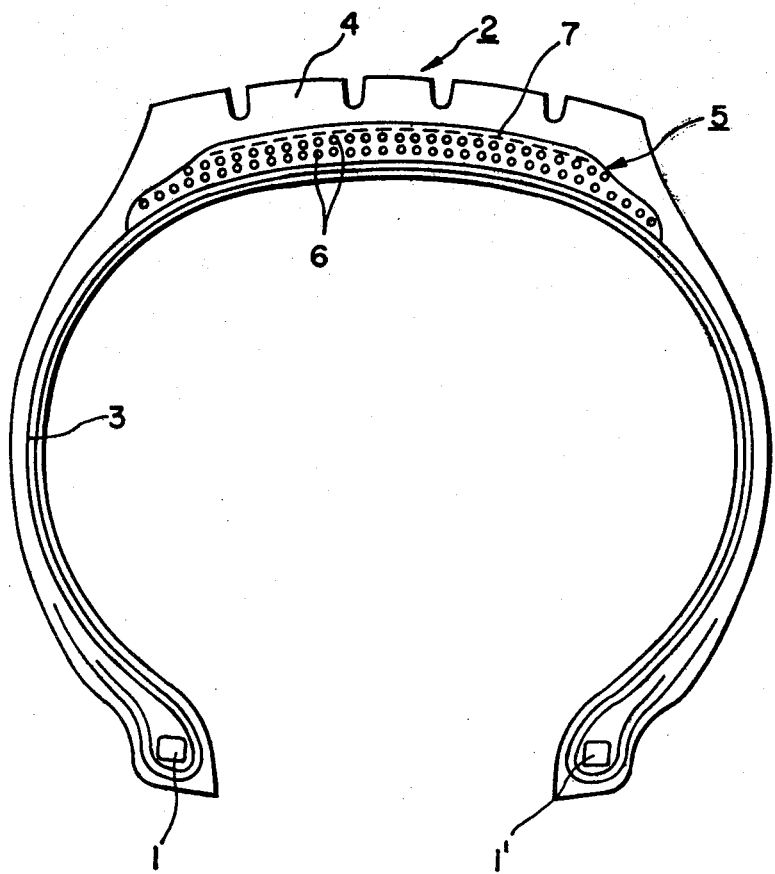
FIGS. 2 and 3 are lateral sectional views of different embodiments of the pneumatic tire according to the present invention, respectively.

In an embodiment of the pneumatic tire of the present invention, as shown in FIG. 2, there is provided a breaker 5 comprising two rubberized glass cord layers 6 on the side close to the axis of rotation of the tire (i.e., on the side adjacent a carcass 3) and one rubberized nylon cord layer 7 on the outer surface of the layers 6 (i.e., on the side adjacent a tread 4). The width of the rubberized nylon layer 7, lateral to the circumference of the tire, or the width of the layer 7 between the left and right edges, as seen in FIG. 2, is narrower than the similarly measured width of the tire crown, so that the rubberized nylon cord layer 7 covers a major portion of the rubberized glass cord layers 6 but not the entirety thereof.

Figure 3:
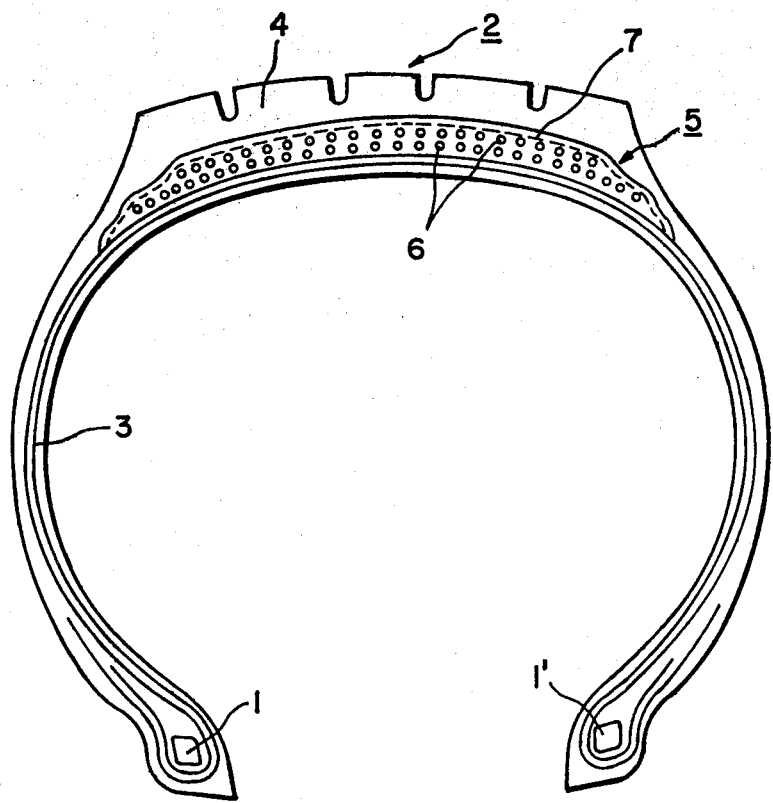

In another embodiment of the pneumatic tire of the present invention, as shown in FIG. 3, use is made of a rubberized nylon cord layer 7, which covers the full width of the two rubberized glass cord layers 6 along the periphery thereof.

In the pneumatic tire of the present invention, the rubberized nylon cord layer 7 can be replaced with a layer of comparatively flexible cord of any suitable material, such as natural or synthetic resin or rejuvenated fibers.

With the aforesaid construction of the pneumatic tire, according to the present invention, a breaker is formed by placing a rubberized textile fiber cord layer 7, e.g., a rubberized nylon cord layer on the outer surface (i.e., on the side facing the rubber tread) of rubberized glass cord layers 6, so that even when cuts and cracks are formed in the tread rubber to allow the penetration of water and mud through the tread, the rubberized textile fiber cord layer 7 disposed in the aforesaid manner prevents the water and mud from flowing to the glass cord layers 6, so that the protective reagent applied on the surface of individual glass fibers constituting the glass cords are guarded against the deterioration by the water and mud reaching thereto. As a result, the tire separation due to the cuts and cracks in the tread portion can be eliminated. At the same time, the rubberized textile fiber layer 7 serves to greatly damp the bending forces and impulsive forces acting on the glass cord layers 6, for eliminating the tire separation due to the fatigue and breakdown of the glass cords caused by such bending forces and impulsive forces.

The inventors have found that the insertion of a rubberized textile fiber cord layer 7, e.g., a rubberized nylon cord layer, on the outer surface of the rubberized glass cord layers 6 so as to cover only the major portion of the latter layers facing the tire crown portion, will be effective in preventing both of the aforesaid two types of tire separation; namely, the tire separation due to cuts and cracks, and the tire separation due to the bending fatigue and the impulsive load on the glass cords without having any cuts and cracks. It is also known that the tire separations are sometimes concentrated on the opposing edges of the breaker 5, depending on the operating conditions, the shape, the structure, and the material of the pneumatic tire. Accordingly, the rubberized textile fiber cord layer 7 should preferably cover the entire width of the rubberized glass cord layers 6, inclusive of the opposing circumferential edges thereof, as shown in FIG. 3. The inventors have found that the rubberized textile fiber cord layer 7 should cover at least three fifths of the road contact width of the tire crown portion 2.

The material for the rubberized textile fiber cord layer 7 is preferably nylon, because the hygroscopic degree of nylon is smaller than that of natural fibers, rayons, and polyesters. Due to such low hygroscopic degree, nylon fiber cord layer 7 can maintain a high strength even when it is exposed to a high moisture.

Tire designers are allowed to select whether the rubberized textile fiber layer 7 covers full or major portion of the width of the rubberized glass cord layers 6, while considering the operating conditions of the tire and its manufacturing cost. Both dispositions, i.e., the partial coverage and the full coverage, fall within the scope of the present invention.

The angle of the cords of the carcass layer 3, relative to the mid circumferential line of the tire, is preferably 30° to 45°. If this cord angle of the carcass is less than 30°, the comfortableness of the vehicle with such tires is deteriorated, while if the cord angle exceeds 45° the tire deformation for a given load increases, resulting in an excessive yield deformation of the carcass side portions and an increased risk of carcass breakage. In a preferred embodiment of the present invention, the cord angle of the rubberized glass cord layers 6, or the angle between the cords of the rubberized glass layers 6 and the mid circumferential line of the tire, is 25° to 35°, or it is 0° to 10° smaller than the aforesaid carcass cord angle. With such breaker cord angle, the pneumatic tire having excellent performance characteristics can be manufactured with ease.

The extent to which the rubberized glass cord layer 6 improves the durability and the maneuverability of the pneumatic tire greatly depends on the belting effects of the breaker layer 5. The structure of the pneumatic tire of the present invention is particularly advantageous when the aspect ratio of the tire (namely the ratio of the tire section height, from the bead to the tread crown surface, to the tire section width) is comparatively small. The preferable value of the aspect ratio in the pneumatic tire of the present invention is 0.85 to 0.6.

In vulcanizing the pneumatic tire, it is preferable to use a mold having a convex crown portion. With such vulcanizing process, high stress is provided to the crown portion of the tire, so that the reinforcing (or belting) effect of the breaker member with the rubberized glass cord layers can be further improved.

Furthermore, in a preferred embodiment of the present invention, the spacing between adjacent glass cords in the breaker 5 is kept at 0.5 mm or wider, by applying suitable rubberized layers thereon. Such rubberizing is useful in preventing the breakdown of the glass cords.

In order to improve the maneuverability of the pneumatic tire, at least one cord layer in the tire breaker layers 5 should preferably be wider than the tire tread width.

Figure 4:
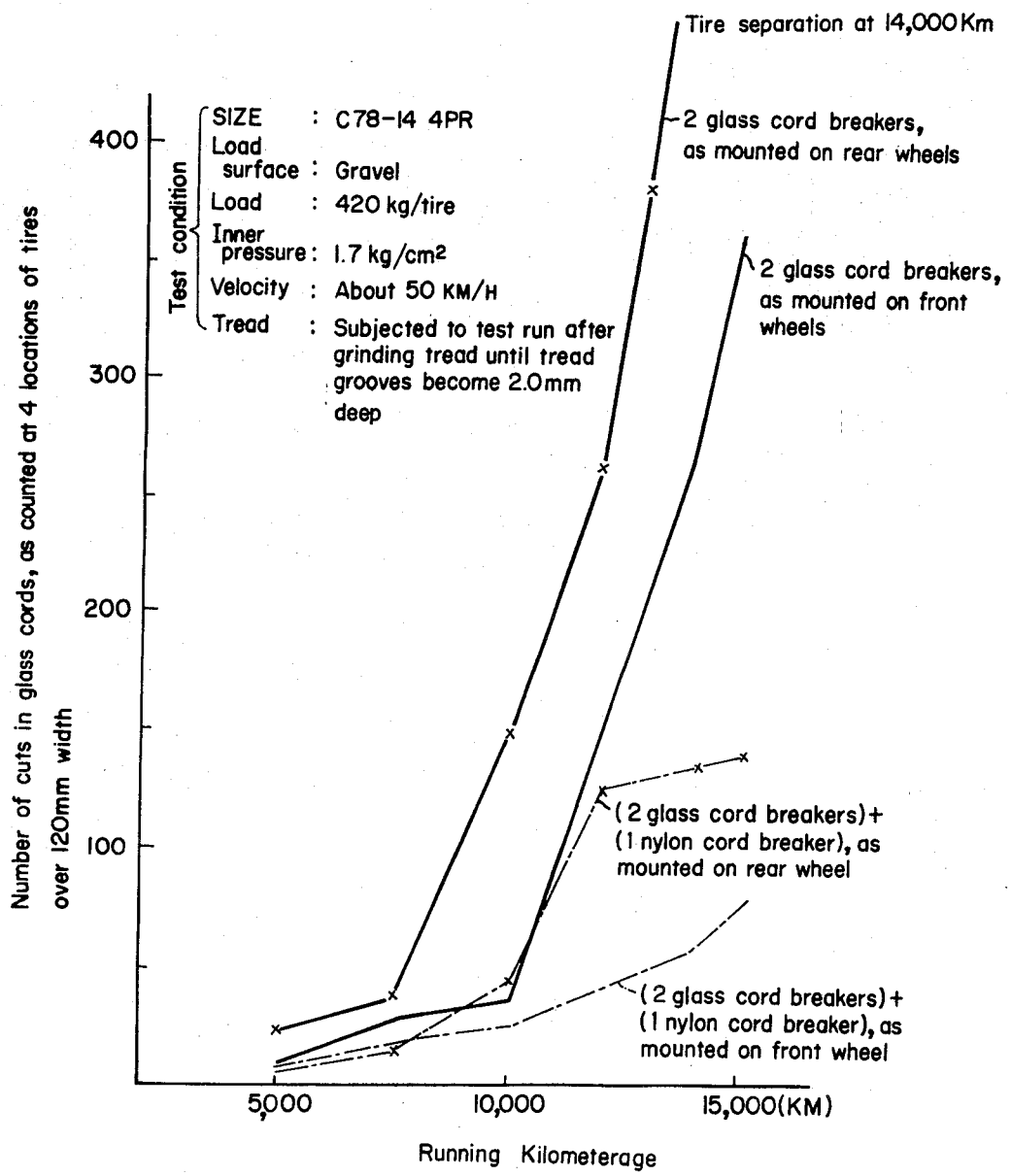
FIG. 4 is a graph, illustrating the results of glass cord breakage measurements taken by actual road running tests.
Figure 5:
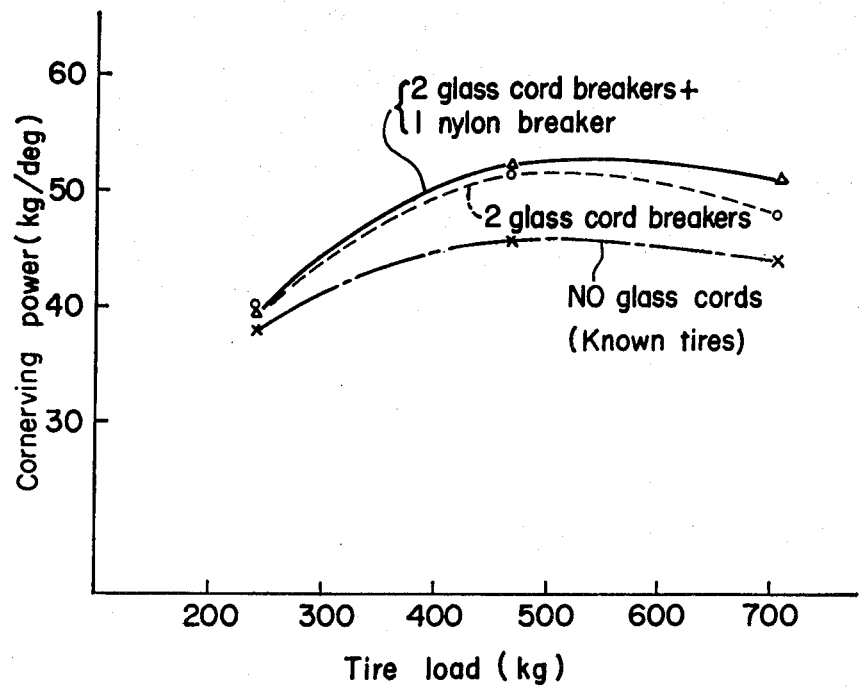
FIG. 5 is a graph illustrating the maneuverability of the tire of the present invention, as compared with that of known tires.

The improvement achieved by the present invention has been confirmed by tests, including actual running tests of the pneumatic tires of the invention mounted on vehicles. The results are shown in FIGS. 4 and 5. FIG. 4 shows the outcome of X-ray inspection of glass cords in pneumatic tires mounted on a test automobile and subjected to actual road tests. In the figure, the abscissa represents the running kilometerage of the tire being tested, while the ordinate represents the number of cuts in the glass fibers constituting the reinforcing glass cords of the tire as detected by the X-ray inspection. The tires used in the tests were passenger car tires of C78-14,4PR size. Prior to test run, the tread portion of each tire was ground until the tread grooves became 2 mm deep. Tests were made both on known tires with breakers each consisting of two rubberized glass cord layers, and on pneumatic tires of the invention, each having a breaker consisting of two rubberized glass cord layers and a rubberized nylon cord layer disposed on the outer surface of the glass cord layers. The test tires were run on gravel roads with a load of 420 Kg/tire, an inner pressure of 1.7 Kg/cm², and an average speed of 50 Km/hour. In order to compare the tire of the invention and the known tires on the same basis, both tires are mounted on the same position of the test car; namely, on front wheels and rear wheels, respectively.

It is apparent from FIG. 4 that with the tire structure of the present invention, the tire separation is greatly reduced, regardless of whether the tires are mounted on the front or rear wheels.

Table 1 shows the results of tire separation tests, which were carried out in an indoor laboratory. A special drum was used in the tests for representing bad road surface conditions. Other test conditions were similar to those of the aforesaid tests described hereinbefore referring to FIG. 4. In addition to the two kinds of pneumatic tires used in the preceding tests, commonly used tires having breakers made of fiber cords alone were also tested, for the sake of comparison.

TABLE 1

| Breaker structure | Running kilometerage before the generation of tire separation |
|---|---|
| 2 glass cord layers | 5,000 – 13,000 |
| (2 glass cord layers) + (1 nylon cord layer) | 20,000 – 25,000 |
| No glass cords (commonly used tire) | 8,000 – 15,000 |

Test conditions :
Tire size : C 78 – 14
Inner pressure : 1.7 Kg/cm²
Vehicle speed : 50 Km/hour
Tire rim : 5J×4
Tire load : 350 Kg It is apparent from Table 1 that the durability of the pneumatic tire of the present invention is 2 to 4 times as long as that of known pneumatic tires having breakers made of glass cords alone, and it is 2 to 3 times as long as that of the commonly used tires having no glass cords. Durability tests were made on the last mentioned three types of pneumatic tires by mounting them on actually running test automobiles. The results are shown in Table 2, in which the durability of each type pneumatic tires for each of the indicated running conditions is represented by a percentage index based on the durability of the commonly used tires for each running conditions, respectively.

TABLE 2

| Breaker structure | good road | bad road | highway |
|---|---|---|---|
| 2 glass cord layers | 132 | 126 | 172 |
| (2 glass cord layers) + (1 nylon cord layer) | 130 | 123 | 171 |
| No glass cords (commonly used tire) | 100 | 100 | 100 |

Test conditions (for highway test automobiles):

Inner pressure : 1.7 Kg/cm²  Vehicle speed : 100 Km/hr.
Tire load : 420 Kg  Rim : 5J×14

FIG. 5 illustrates the maneuverability of the pneumatic tires according to the present invention, in which the abscissa represents the tire load and the ordinate represents the cornering power. The maneuverability of the pneumatic tires of the present invention is apparently better than that of the commonly used conventional tires having fiber textile cord breaker without any glass cords, and it is comparable with, or in fact slightly better than, that of pneumatic tires having breakers solely made of rubberized glass cords.

As described in the foregoing disclosure, according to the present invention, there is provided a pneumatic tire having a breaker reinforced by rubberized glass cord layers so disposed as to face the tire carcass and at least one rubberized flexible fiber cord layer so disposed as to face the tire tread, whereby the maneuverability and the abrasion resistivity are improved as compared with those of commonly used known tires without any glass cords, and outstandingly high durability is achieved by reducing the risk of the tire separation.

What is claimed is:

1. A pneumatic bias tire comprising
a pair of bead portions;
a carcass layer comprised of rubberized cords being secured to the bead portions at the opposite ends thereof, respectively, and extending from one bead portion to the other bead portion through a tire crown portion at an angle of 30° to 45° relative to the mid circumferential line of the tire;
a tread layer covering the outer peripheral surface of the carcass layer; and
a breaker disposed in the crown portion between the carcass layer and the thread layer, said breaker comprising at least two rubberized glass cord layers comprised of rubberized glass cords facing the carcass layer and at least one rubberized textile fiber layer facing the tread layer and spreading substantially in contact with the outermost glass cord layer.

2. A pneumatic tire according to claim 1, wherein said glass cords in said rubberized glass cord layers are disposed at an angle of 25° to 35° relative to the mid circumferential line of the tire while keeping spacings of not narrower than 0.5 mm between adjacent glass cords.

3. A pneumatic tire according to claim 1, wherein the width of the rubberized textile fiber cord layer is such that the rubberized textile fiber cord layer covers the entire width of the rubberized glass cord layers.

4. A pneumatic tire according to claim 1, wherein said rubberized textile fiber layer includes nylon fibers.

5. A pneumatic tire according to claim 1, wherein at least one of said breaker layers is wider than the width of said tire tread layer.

6. A pneumatic tire according to claim 1, wherein the angle of the rubberized glass cord relative to the mid circumferential line of the tire is 0° to 10° less than the angle of said carcass cords relative to the mid circumferential line of the tire.

* * * * *